United States Patent [19]

Rembaum et al.

[11] 3,944,485
[45] Mar. 16, 1976

[54] ION-EXCHANGE HOLLOW FIBERS

[75] Inventors: Alan Rembaum; Shiao-Ping S. Yen, both of Altadena, Calif.; Elias Klein, New Orleans, La.

[73] Assignee: California Institute of Technology, Pasadena, Calif.

[22] Filed: May 23, 1973

[21] Appl. No.: 363,130

[52] U.S. Cl............. 210/24; 260/2.1 E; 260/2.2 R; 264/41
[51] Int. Cl.². B01D 15/00; C08J 5/24; B29D 27/00
[58] Field of Search............. 210/24, 30, 34, 37, 38; 260/2.1 E, 2.2 R, 879; 264/113; 161/178

[56] References Cited
UNITED STATES PATENTS

| | | | |
|---|---|---|---|
| 3,186,941 | 6/1965 | Skiens................................ | 210/32 |
| 3,293,195 | 12/1966 | Greer............................. | 260/2.1 E |
| 3,342,729 | 9/1967 | Strand........................... | 210/500 M |
| 3,423,491 | 1/1969 | McLain et al............. | 210/500 M X |
| 3,453,354 | 7/1969 | Tejeda et al....................... | 264/113 |
| 3,541,030 | 11/1970 | Boies............................. | 260/2.1 E |
| 3,553,306 | 1/1971 | Church........................ | 260/2.1 E X |
| 3,645,922 | 2/1972 | Weiss et al.................. | 260/2.1 E X |
| 3,754,055 | 8/1973 | Rembaum..................... | 260/879 |

OTHER PUBLICATIONS

Helfferich, Ion Exchange, McGraw–Hill, 1962, pp. 134–136.

*Primary Examiner*—Frank A. Spear, Jr.
*Assistant Examiner*—Ferris H. Lander
*Attorney, Agent, or Firm*—Marvin E. Jacobs

[57] ABSTRACT

An ion-exchange hollow fiber is prepared by introducing into the wall of the fiber polymerizable liquid monomers, and polymerizing the monomers therein to form solid, insoluble, crosslinked, ion-exchange resin particles which embed in the wall of the fiber. Excess particles blocking the central passage or bore of the fiber are removed by forcing liquid through the fiber. The fibers have high ion-exchange capacity, a practical wall permeability and good mechanical strength even with very thin wall dimensions. Experimental investigation of bundles of ion-exchange hollow fibers attached to a header assembly have shown the fiber to be very efficient in removing counterions from solution.

15 Claims, 5 Drawing Figures

ION-EXCHANGE HOLLOW FIBERS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to ion-exchange materials and, more particularly, this invention relates to novel ion-exchange hollow fibers and methods of forming and using such fibers.

2. History of the Prior Art

Current technology for removal of ions from dilute streams is largely oriented to the use of conventional packed, ion-exchange beds. These processes, however, have their problems. There is, for example, significant current effort toward the development of macroreticular pores in the ion-exchange beads which would be less susceptible to irreversible clogging. There are problems in the preparation of beads which have adequate porosity but which are still not unduly fragile. In the preparation of commerical ion-exchange beads, the process is as follows:

A cross-linked polymer bead is formed by reacting, for example, styrene and divinylbenzene. The percentage of cross-linker (divinylbenzene) determines the extent of swelling in the final bead as ions are exchanged. The greater the percentage of cross-linker, the less the swelling. Concurrently, the greater the level of cross-linker, the slower will be the diffusion of exchanging ions into and out of the beads, and the slower will be the process.

After the bead is formed, a chemical reaction such as sulfonation or chlormethylation is used to form the ion-exchange sites. From the description it is apparent that there are conflicting demands: high cross-link density helps stability but reduces product rate. Similarly, high ion-exchange capacity from the second step induces large swelling excursions, but provides greater capacity. Swelling of the resin beads occurs due to the osmotic pressures which are generated when the beads are exposed to different concentrations of various electrolytes. Pressure drop build-up is irregular and troublesome in regeneration processes. The choice of operating cycles is not straightforward at all and the beads are not inexpensive.

An alternative exists in semipermeable flat membranes but the technology is still in its infancy and the costs to efficiency ratio of membrane processes is not very satisfactory. Ion-exchange membranes offer significant adavantages in separation processes with respect to ion-exchange resin beads. When the ion-exchange resins are in the form of membranes, they can be in contact with the solution to be separated and the stripping solution simultaneously and the ion-exchange process can be continuous rather than cyclic.

A continuous process with ion-exchange membranes has several advantages over an ion-exchange resin column. Some of these are (1) a separate regeneration step is eliminated, (2) the product has a constant composition, (3) the hold-up volume is low, and (4) operation and control of the process are simple. The controlling factors with respect to rate of transport of ions across such membranes are as follows: (a) The membrane must be thin so that the resistance to diffusion is minimal. (b) The membrane must be semipermeable, i.e., if the membrane has positive charges they must be so uniformly and closely distributed that any solid trying to permeate the structure will always see some of the fixed charges. The consequence of this distribution is that only ions opposite in charge to the fixed charges can permeate the membrane. All ions having the same charges as the fixed charge are excluded by electrostatic repulsion. (c) The resistance to hydraulic permeability should be as low as possible consistent with the above requirements. Since this requirement and the preceding requirement are conflicting, all practical membranes are a compromise of these two objectives. (d) The flux of ions across all membranes is proportional to the area available for transfer.

These requirements result in certain limitations of the flat membrane system. The productivity per unit volume is unsatisfactory and the membranes must be supported in any separation device. Ion-exchange membranes cannot be manufactured by the same techniques utilized to form ion-exchange beads since the swelling resulting from the formation of the ion-exchange site is too great to be borne by membranes which have a low degree of cross-linking. However, if the degree of cross-linking is raised, the membrane is too brittle to be useful. Most flat ion-exchange membranes are formed by first forming ion-exchange beads and then milling the beads into a thermoplastic resin as a binder for the resin structure. In a more recent process, the thermoplastic resin is milled in the presence of a swelling agent which is then replaced with a graftable ionic monomer. After grafting, the ionic site is bound to the membrane. The mechanical requirements are satisfied by using relatively thick sheets, in the range of 100–300 microns.

The hollow fiber configuration of a membrane offers the opportunity to prepare thin-walled devices with very large surface areas. Such a device would also provide the flexibility of high transport rates per unit volume and the possibility of continuous operation without the need for regeneration cycles. Further advantage over other configurations is that supports are not required for the hollow fibers.

Anionic exchange hollow fibers have not been reported. Sulfonic acid cationic exchange type of hollow fibers have been prepared by irradiating polyethylene hollow fibers, immersing the irradiated fibers in styrene and heating the mixture to effect grafting. The fibers are then swollen in dichloromethane and suflonated with chlorsulfonic acid, followed by hydrolysis. This procedure requires several steps, effects a random ion-exchange capacity and is limited to special reactants. Post-treatment of hollow fibers is further limited since the very small cross-section of the fibers and the fine porosity of the walls prevents introduction of preformed polymers into the bore or impregnation into the walls.

SUMMARY OF THE INVENTION

Ion-exchange hollow fibers are prepared according to the invention by introducing into the wall of the preformed fiber polymerizable liquid monomers and polymerizing the monomers therein to form solid, insoluble, ion-exchange resin particles embedded within the wall of the fiber.

In a preferred embodiment of the invention, the mixture of polymerizable monomers is fed into one end of the fiber and pumped through the other end. In a permeable fiber, the mixture will also exude through the pores in the walls. After the particles of polymer have been formed, the excess particles blocking the central passage are removed by forcing liquid through the bore of the fiber.

The ion-exchange fibers of the invention have several further advantages as compared to resin beads or flat membranes. There is reduced pressure drop available through the controlled dimensions of the fluid passages. In addition, the wall thickness which holds the ion-exchange sites can be reduced to 30–40 microns without prejudicing the integrity of the structure, such as is experienced with reticulated beads. Finally, the difficulties experienced by the swelling and deswelling of spheres is reduced in the cylindrical configuration of the fiber. This, in turn, allows more rapid unloading of the active sites during the regeneration cycle.

The ion-exchange hollow fibers of the invention have a high ion-exchange capacity, good mechanical strength and uniform ion-exchange capacity throughout. The treated fibers will find use as membranes in water treatment, dialysis and generally to separate ionic solutions. In the case of constraining cationic resins such as polyquaternary particles within the pores of the walls, the fibers can be utilized to separate chromate, phosphate, uranate, uranium sulfate complexes, cyanide or carbonate from solutions in industrial applications such as waste water treatment, process streams, plating baths or mine wastes. Hollow fibers treated to contain anionic resins such as sulfonic resins can be utilized to remove cations from aqueous solution.

A very attactive, continuous ion removal process is provided with the fibers of the invention utilizing the Donnan principle. It has been shown that when a dilute polyvalent ion is separated by an ion selective membrane from a concentrated solution of a lower valency, the mobile ions will distribute between the two solutions in such a way that the multivalent ion will concentrate in the more concentrated solution.

One very important application of such a process is in chromate removal. Chromates are used as corrosion inhibitors in various industrial water streams such as in boilers and cooling water service. In time, these streams build up in calcium and other cations which precipitate with carbonate. periodically, a purge is required. This chromate contaminated blowdown is a toxicity hazard and cannot be disposed of indiscriminately. The disadvantages of of packed ion-exchange resin beads have been discussed. An alternative does exist in the precipitation of a reduced chromate. This is effective for processing various liquors but is not economically attractive and not easily manageable for streams having low chromate concentration levels.

In accordance with the invention, the Donnan pumping principle is extremely effective using strong $Cl^-$ concentrations to pump dilute chromate against its concentration gradient.

Thus, when a $K_2CrO_4$ solution of 10 ppm is fed through the core of the polyquaternary resin treated fibers of the invention, and the outside of the fibers bathed with a more concentrated NaCl solution, the exit concentration of $CrO_4^=$ was found to be less than 0.02 ppm. the permeability of the wall, the charge density of the ion exchanger, the relative velocities of the dilute and concentrated streams were responsible for the separation and concentration effected.

These and other advantages of the invention will become apparent as the invention becomes better understood by reference to the following detailed description when considered in conjunction with the following drawings.

DESCRIPTION OF THE PREFERRED EMBODIMENTS

Figures 1, 2:
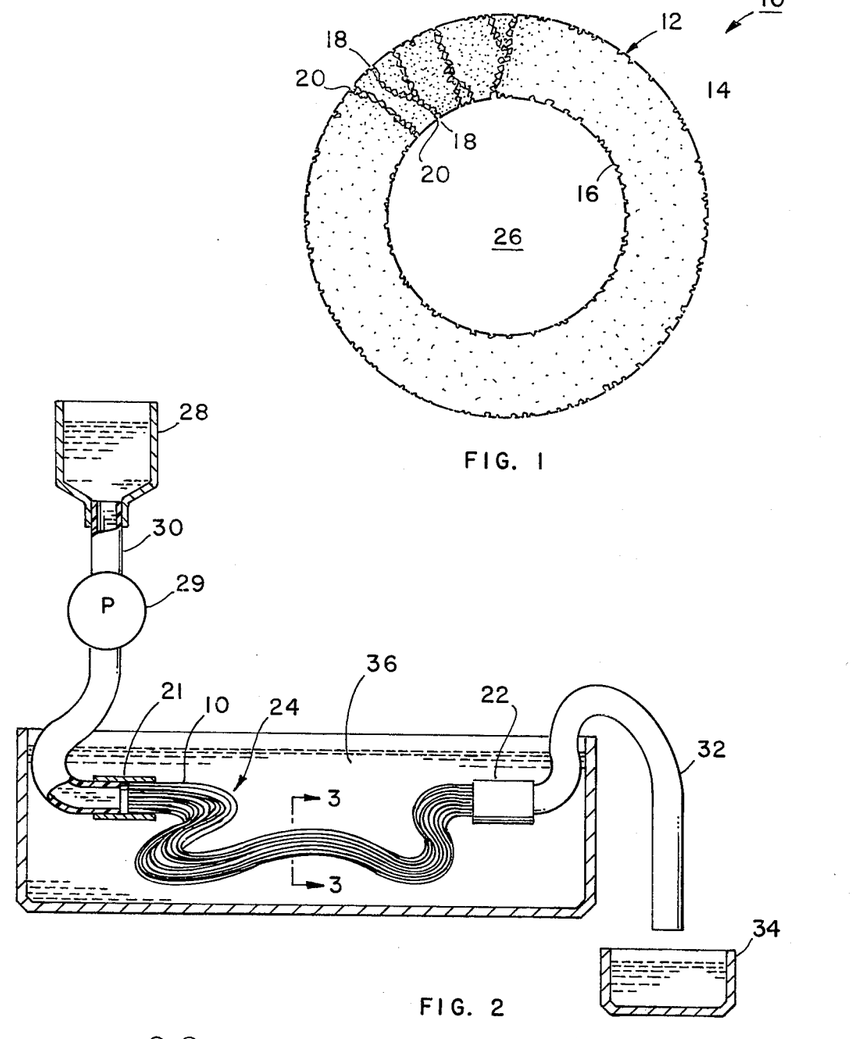
FIG. 1 is a cross-sectional view of a single hollow fiber.
FIG. 2 is a schematic view of a shallow fiber tube assembly.

Referring now to FIG. 1, a hollow fiber 10 has an annular configuration, typically cylindrical. The wall 12 of the fiber 10 includes an outer skin 14 and an inner skin 16. The wall 12 contains microvoids or pores 18 which join across the wall to form a path or channel providing microporosity or semipermeability characteristics to the fiber. Particles 20 of ion-exchange resin are formed within and embedded within the pores without blocking the pores in accordance with the invention.

The dimensions of the fibers are selected depending on the use and capacity of the end device. Length of the fibers is the least important dimension and is dependent on the amount of ion to be removed, the flux rate through the wall, the flow rate of solution, the number of fibers in a bundle, and the practical length of the unit. The wall thickness, permeability and ion-exchange capacity are the most influential factors in the performance and effectiveness of ion-exchange hollow fibers.

The wall thickness is preferably as thin as practical under the circumstances and is preferably as low as 10 microns, typically from 20 to 300 microns, preferably 30–100 microns. The inside diameter is always maintained as low as possible to maximize available surface area. The inside diameter typically ranges from 50 to 1000 microns.

The morphology of the fiber used for resin deposition will determine the pore density and average pore size of the resulting ion-exchange fibers. Characterization of membrane morphology is in itself a difficult study, so that phenomonological parameters have been used by many investigators to describe membrane properties.

The descriptors found most useful are the wate content of the membrane, the hydraulic resistance of the membrane, and the permeability rates of several solutes through the membrane walls. These values can sometimes be reconciled with a pore model of transport, when an independent measurement of either pore area or pore diameter can be achieved.

Pore diameters (d) of the largest pores present can be measured by the pressure of air required to displace a fluid of known surface tension from the walls of the pores if the fluid wets the pore wall. For isotropic structures, the relationship between air pressure p (in psi) and surface tension $\gamma$ (in dynes/cm) is given by:

$$P = \frac{0.415\,\gamma}{d}$$

Attempts to measure displacement pressure, up to the pressure level that the fibers can contain, were unsuccessful. This indicates that the average pore size is smaller than 1000 angstroms.

The hydraulic permeability of the fiber bundles can be measured by determining the rate of water permeated per unit area (A) under a specified driving force. The relationship $$J_v = L_p A \Delta P \tag{1}$$

has been found linear over a range of pressures. $J_v$ is measured in cc/sec, and $\Delta P$ is expressed in atmospheres. The dimensions of $L_p$ are then $cm^3\ cm^{-2}\ sec^{-1} atm^{-1}$. Another useful expression of this relationship is in terms of the inverse of the permeability coefficient, i.e., $1/L_p$. The inverse can be considered a resistance coefficient, $R_{H_2O}$; when membranes are used in series, the total resistance is an additive function of the individual resistances.

A third sensitive descriptor of membrane structure is the permeability coefficient of specific solutes. The arrangement for measuring the permeability coefficient utilizes a fiber bundle through which the solution is pumped at a constant and controlled rate. The fibers are bathed in a large excess of solution in which the concentration of the solute being tested is maintained close to zero. The solute, therefore, diffuses out of the fiber bores as a result of the concentration gradient across the fiber wall. Since the gradient is changing along the axis of the fiber, provision must be made for estimating the form of the gradient.

The material balance of the solute concentration can be written by:

$$-\dot{M} = Q_v(C_o - C_i) \tag{2}$$

where $\dot{M}$ is the rate of solute loss through the walls, $Q_v$ is the axial flow of solution, $C_i$ and $C_o$ are the inlet and outlet concentrations respectively. Similarly, if the process is diffusion controlled, one can project that the rate of solute transport is directly proportional to the area available for permeation, and the average concentration gradient:

$$-\dot{M} = \bar{P}\,\bar{A}\,(\Delta\bar{c}) \tag{3}$$

where $(\Delta\bar{c})$ is an average concentration gradient.

Using a log average depletion of solute, we get:

$$(\Delta\bar{c}) = (C_o - C_i)/\ln\frac{C_i}{C_o} \tag{4}$$

Equating equations (2) and (3) leads to:

$$P = \frac{Q}{A}\ln\frac{C_i}{C_o} \tag{5}$$

With equation (5) it is relatively simple to estimate the permeability coefficient using steady state analyses. As in the case of the hydraulic permeability, the solute permeability can be conveniently expressed as a resistance, i.e $1/\bar{P}$.

Typical initial hdyraulic permeabilities of the fiber wall are from 1 to 100 × $10^{-5}$ ml/cm² sec atm. The corresponding solute diffusive permeabilities (cm/sec) for a 110 molecular weight molecule is 5.6 to 55.6 × $10^{-5}$ and for a 1,200 molecular weight molecule is 1.2 to 6.7 × $10^{-5}$. These fibers will not allow a 60,000 MW protein (albumin) to permeate, so there is a maximum in the pore size that is smaller than the mean diameter of this protein. There are at present no clear-cut techniques by which the pore size and pore frequency can be measured without irreversible alterations of the structure during the measurement. Therefore, the solute profile of permeabilities is a a definite parameter defining the microporosity of the fibers. The initial permeability is modified during treatment due to embedment of ion-exchange particles within the pores, swelling and collapse of walls of some pores or microvoids. The porosity of the final polymer is preferably chosen such that there is no leakage of ions other than the separated ion through the wall.

Hollow fibers are an outgrowth of textile spinning of synthetic organic polymers in order to produce high-bulk, low density fabrics. Hollow fibers are manufactured from textile grade resins and may be spun by wet spinning (spinning from a polymer solution into a liquid coagulant); dry spinning (spinning from a solution of a polymer in a volatile solvent into an evaporative column); or by melt spinning. The tubular cross-section is formed by extruding the molten polymer or polymer solution through an annular dye or spinneret.

The fibers should preferably be formed from high-strength, high-modulus fibers since these can be formed with thin walls, yet allow higher operating pressure drops and permit negation of osmotic flows accompanying the ion-exchange phenomenon. The fibers should also exhibit chemical compatibility with and stability to the ion-exchange polymerization system. The polymerization system should not dissolve or permanently alter the fiber morphology during formation and embedment of the ion-exchange particles.

Textile grade acrylic fibers, suitably polymers of acrylonitrile, have been found to be compatible with the polyquaternary polymer reactants of this invention. The polyacrylonitrile may be homopolymers or copolymers containing up to 20% by weight of comonomers such as ethyl acrylate or vinyl acetate.

The acrylonitrile polymers are wet spun from a 15–25% solids solution in a highly polar solvent such as dimethyl acetamide, dimethl formamide or 40% CaSCN through an annular spinneret into a liquid coagulant such as water. The pore size and distribution can be controlled by selection of solvent. A specific example follows.

EXAMPLE 1

A 20% solids solution of fiber grade polyacrylonitrile in dimethyl acetamide was wet spun through an annular spinneret and coagulated in a bath of water to form lengths of hollow fibers having an I. D. of 0.0250 cm and a wall thickness of 0.0040 cm.

The diffusivities of certain solutes through the wall of the fiber of Example 1 are provided in the following table.

Table 1

| Transport Properties of Starting Fiber | |
|---|---|
| Hydraulic permeability | $6 \times 10^{-5} cm^3 cm^{-2} sec^{-1} atm^{-1}$ |
| Solute Resistances | |
| Creatinine | 100 min/cm |
| Glucose | 160 min/cm |

The ion-exchange resin forming reactants are capable of penetrating the pores of the wall of the hollow fiber. The reactants are also preferably capable of entering the bore of the fiber and being pumped through the fiber and exuding through the walls. The reactants therefore are selected to have a molecular weight less than 2,000 to 6,000 and are capable of forming cross-linked insoluble particles within the pores of the fiber wall.

Quaternized, cross-linked, insoluble copolymers of unsubstituted and substituted vinyl pyridines and a dihalo organic organic compound are spontaneously formed at ambient temperature on mixing the two monomers in bulk, in solution or in suspension as disclosed in copending application Ser. No. 102,239, the disclosure of which is incorporated herein by reference. The amount of cross-linking may be varied according to the composition and reaction conditions. The reaction yields small particles capable of depositing within the pores without blocking the pores. The non-embedded particles can readily be washed out of the fiber.

The polyquaternary, water insoluble, cross-linked materials are prepared by reacting a vinyl pyridine with a dihalo organic compound of the formula:

$$X - R_1 - X$$

where X is halo, preferably bromo, chloro or iodo and $R_1$ is a divalent organic radical such as alkylene, alkenylene, alkynylene, arylene, alkarylene or aralkylene. $R_1$ may also be alkylthioalkylene or alkyloxyalkylene of the formula $(CH_2)_x(Z)_y(CH_2)_z$, where Z is oxygen or sulfur and x, y and z are integers from 1 to 100. $R_1$ may also be of prepolymer or polymeric length of up to 6,000 molecular weight such as a bromo-terminated polybutadiene, but, preferably has a carbon content of from 1 to 20 carbon atoms to provide an increased charge center density per unit volume and weight of the polymeric product. $R_1$ may be substituted with other groups that do not interfere with the polymerization reaction or properties of the polymer product such as hydroxyl, alkyl, aryl, nitro, cyano or similar groups.

Representative dihalo organic compounds are α,ω-alkylene or alkenylene halides such as dibromo methane, 1,2-dibromoethane, 1,3-dibromopropane, 1,4-dibromobutane, 1,4-dibromo-2-butene, 1,4-dichloro-2-butene, 1,4-dibromo-2,3-dihydroxy butane, 1,5-dibromopentane, 1,6-dibromohexane, 1,8-dibromooctane, 1,10-dibromodecane, and 1,16-dibromohexadecane. The alkenylene compounds such as 1,4-dibromobutene are found to be more reactive than the corresponding saturated compounds. Dihalbaromatics such as o, m and p-dichloro- or o, m and p-dibromoxylene are also suitable. Cross-linked, insoluble products would also be formed from terminally brominated prepolymers such as polyethylenes, polypropylenes, polybutylenes, polybutadienes, polyoxyethylene, etc. As the number of carbon atoms in the dihalide increases, elastomeric properties are favored and polyelectrolyte properties decrease.

4-vinyl pyridine is the most reactive of the vinyl pyridine isomers. However, 2-methyl-5-vinyl pyridine is available at lower cost and provides products of similar properties. 2-vinyl pyridine has been found to be much less reactive than the other monomers.

The polycationic, cross-linked products are prepared simply by mixing the vinyl pyridine monomer with the dihalide in various proportions and allowing the mixture to react until solid materials are formed.

The reaction is believed to proceed through a first stage in which two molecules of vinyl pyridine react with a molecule of a dibromide to form a quaternary intermediate as illustrated below:

Two molecules of the intermediate dicationic, diunsaturated cross-linking agent then react through the vinyl group to form an intermediate having a structure of the formula:

The intermediate reacts further to give a cross-linked network with a small amount of residual unsaturation. Although this mechanism is dominant, other intermediates are also formed. The reaction proceeds spontaneously at room temperature, about 25° c, but may be accelerated by heating the reaction to a higher temperature, usually below 100°C, and suitably from 25°–60° C. The unsaturation on the growing polymer as well as on the finished resin may be utilized in further reactions, e.g. grafting onto substrates by means of Co $\gamma$ radiation.

Cross-linking of the product is also facilitated by irradiating the mixture with radiation capable of forming reactive species to cross-link the vinyl groups, suitably gamma radiation from a cobalt source. The reaction may be conducted in bulk, in a solvent for the monomer or in water suspension. The reaction proceeds faster in bulk, but yields are higher in solvents. Higher yields are favored in polar solvents such as dimethylsulfoxide, dimethylformamide, methanol, ethanol, or combinations thereof. Particularly high yields have been obtained with a 1/1 volume mixture of dimethylformamide and methanol. Slower reaction occurs in solvents such as benzene.

The rate of reaction is found to be much higher with bromides, as compared to the corresponding chlorides. The ratio of monomers is controlled such that there is an excess of dibromide in the mixture. A suitable ratio is a stoichiometric ratio of 2 mols of vinyl pyridine to at least 1 mol of the dibromide. It has been found that when the polymerization is conducted with an excess of vinyl pyridine, unchanged vinyl pyridine can be recovered. It has further been found that oxygen and carbon dioxide interfere, inhibit and slow the reaction. Also free radical inhibitors such as hydroquinone do not interfere or slow down the reaction rate. Higher polymerization rates are favored by conducting the reaction in vacuum. The properties of the polymer products can be varied by using excess of dihalide. The resulting product in this case contains nonionic halogen capable of further reaction. Any residual halogen in the ion-exchange resin particle or the nonionic halogen introduced by use of excess dihalide can be further reacted with a monoquaternizing reagent such as trimethylamine, dimethylamine or pyridine to increase the ion-exchange capacity of the particles and of the fiber.

The properites of the polymer products can be further varied by conducting the polymerization in the presence of excess monomer and a molecule capable of monoquaternization such as alkyl or alkenyl halide, hydrogen halide, dimethylsulfate, etc. The amounts of the quaternizing species are varied in such a way as to maintain the proportions: 2 moles of vinyl pyridine to 1 mole of dihalide and, 1 mole of vinyl pyridine to 1 mole of quaternizing species. Thus, for a polymer formed from a mixture containing 1 mole of dihalide and 0.5 mole of quaternizing agent, 2.5 moles of vinyl pyridine are required. By varying these proportions, different amounts of cross-linking are obtained and the resulting resins differ mainly in their swelling properties.

The hollow fibers are treated in accordance with the invention by introducing polymerizable liquid monomeric reactants into the pores of the wall and polymerizing and embedding the fibers therein. The monomers may be impregnated into the walls by immersing the fiber in a mixture of the monomers under pressure. It is preferred to introduce the mixture of monomers into one end of the fiber and force it through and out the other end and through the pores of the walls to insure polymerization within the pores. Excess ion-exchange polymers are simply washed out after polymerization is complete. The procedure could be successfully repeated to increase ion-exchange capacity of the fiber.

Figure 3:
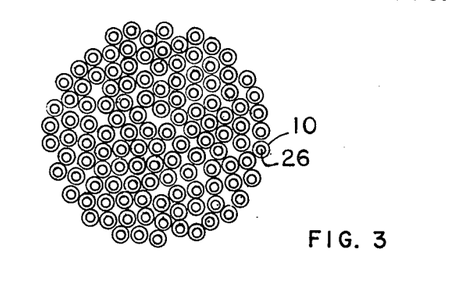
FIG. 3 is a sectional view along line 3—of FIG. 2.

Referring now to FIGS. 2 and 3, the fibers 10 are generally attached to inlet header 21 and an outlet header 22 to form a bundle 24. The headers 21, 22 facilitate pumping liquids into the channel 26 of the fibers under low pressure. The headers are potted to the fibers with a suitable resin such as a polysiloxane or an epoxy resin compatible with the fibers such as the polyacrylonitrile fibers of inlet 1. The inelt header 21 is connected to a funnel 28 by means of flexible tubing 30 and the outlet header 22 is attached to a length 32 of flexible tubing leading to a collection vessel 34. Pumping liquid through the fibers is accommplished by means of a positive pump 29 such as a peristaltic pump connected to the flexible tube 30 or by means of a suction pump attached to the exit tubing 32. The bundle 24 of fibers 10 is immersed in a bath 36 of regeneration liquid during use but may simply be exposed to the atmosphere during treatment. A specific example follows.

EXAMPLE 2

An 8-inch long bundle of 150 fibers prepared according to Example 1 was potted by means of a polysiloxane into inlet and outlet headers. A bulk mixture of 2 moles or 4-vinyl pyridine and one mole of 1,2-dibromoethane was forced from a syringe into the inlet header and into the core of the polymers until the liquid mixture exuded through the walls of the fibers and appeared in the outlet header. The polymerization proceeded spontaneously for about three days. Before polymerization was completed, water was injected into the header with a syringe to open the central channel of the fibers and to prevent plugging. The polymerization proceeded within the pores of the fiber wall to form particles of an insoluble, cross-linked polyquaternary resin.

EXAMPLE 3

Example 1 was repeated substituting dibromohexane for the dibromoethane. An ion-exchange hollow fiber resulted having an ion-exchange capacity about one-half that of the product of Example 2.

After formation of the polyquaternary ion-exchange resin in the fiber walls, significant changes in the transport properties of ionic species were expected. The end point of such transport was governed by the equilibrium expressions derived by Donnan, and the most significant property which governed this equilibrium was the charge density of the immobilized species. If the charge density is adequately high, the membrane will be truly "semipermeable" and the Donnan assumptions apply. In these experiments, the immobilized species was the quaternary nitrogen, and the gegenions were negative ions. the concentration of the fixed groups was determined by exchanging the gegenions to ($OH^-$) forms by thorough washing in 0.1 N NaOH. The fibers were then placed in a known excess of HCl, and after 24 hours the fibers were removed, rinsed, and the remaining HCl titrated.

Titration of an aliquot of fiber indicated that 0.92 milliequivalents of ($OH^-$) were bound to 1.3 gms of fiber to give 0.71 meq/gm. The sample represented 155 $cm^2$ so that the charge per unit area of membrane was 0.006 $meq/cm^2$.

The introduction of a significant weight of ion-exchange polymer into the polyacrylonitrile fiber should change the permeability of the fiber wall to water and to nonionic solutes, since the void volume is reduced. This reduction is shown by the data in Table 2.

Table 2

| | |
|---|---|
| Hydraulic Permeability | 1.6 cm$^3$cm$^{-2}$sec$^{-1}$atm$^{-1}$ |
| Solute Resistances | |
| Creatinine | 550 min/cm |
| Glucose | 1,400 min/cm |

The hydraulic permeability has been reduced by a factor of four, and the solute resistance of creatinine has increased by a factor of five. The solute measurements were performed both initially, and after ion-exchange deposition, with a 0.86% NaCl supporting electrolyte concentration. It was later found that the ion-exchange resin operated effectively at this NaCl concentration so the permeability decrease may reflect, in part, a wall thickness increase due to osmotic swelling.

The property that is most significant, of course, is the semipermeability of the fiber wall with respect to anions. To examine this function, $CrO_4^=$ anions were used because of the ease with which very small concentrations can be measured and because of the current interest in removing such ions from water cooling systems.

The hollow fiber assembly of Example 2 was utilized to remove chromate ions from a dilute solution (10 ppm $Cr^{+6}$). Referring again to FIGS. 2 and 3, the bundle 24 is immersed in a vessel 36 containing an NaCl aqueous solution. The dilute chromate solution was injected under controlled pressure into the funnel 28 and a solution having very low chromate and chloride ion content was removed from outlet header 22. A specific example follows.

EXAMPLE 4

Figure 4:
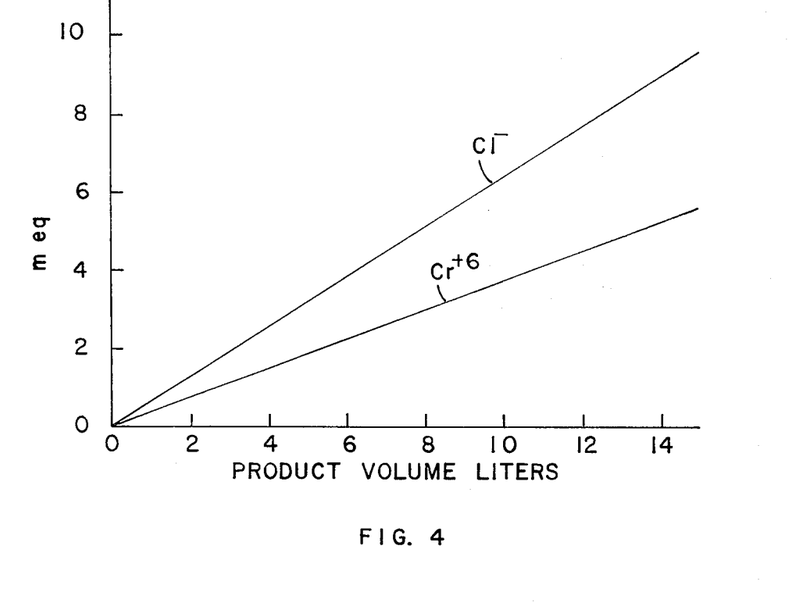
FIG. 4 is a graph showing the amount of $Cl^-$ and $Cr^{+6}$ transferred across the wall of an ion-exchange hollow fiber.

A concentration of 2.0 × 10$^{-4}$ M K$_2$CrO$_4$ was pumped at 3.0 cc/min through a fiber bundle containing 150 fibers (153.1 cm$^2$). The fiber was bathed externally in a slowly stirred solution containing initially 0.25M NaCl. The core solution leaving the fiber fundle contained less than 4 × 10$^{-6}$ M CrO$_4$ (present low limit of analysis), and 6.5 × 10$^{-4}$ M Cl$^-$. The external bath increased continuously in CrO$_4^-$ concentration, and decreased in Cl$^-$ concentration as shown in FIG. 4.

Figure 5:
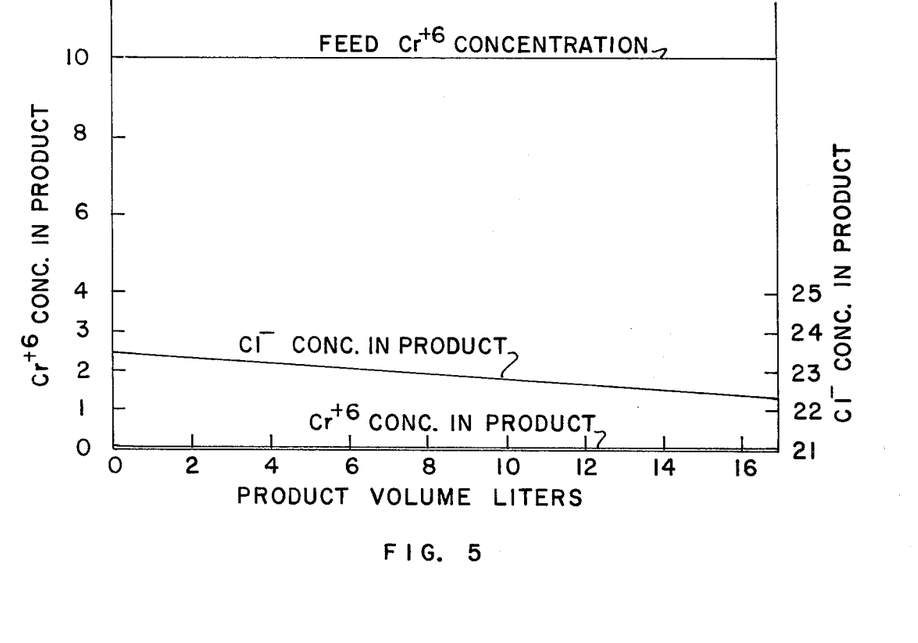
FIG. 5 is a graph showing the product concentrations of $Cl^+$ and $Cr^{+6}$ in the feed and effluent as a result of separation across an ion-exchange hollow fiber.

In a perfectly semipermeable system, the number of milliequivalents of $CrO_4^=$ permeating the wall would be exactly equal to the number of milliequivalents of Cl$^-$ moving in the other direction. The actual situation is not perfect. FIG. 5 shows the number of milliequivalents of each ion that permeated as a function of the total volume of fluid processed through the cores of the fibers. Considering the very large gradient of (Cl$^-$) available and the small gradient of (CrO$_4^-$), the lack of ideality is not surprising. At the end of the experiment, when 15 liters had been processed through the fibers, the external bath was 40 × 10$^{-4}$ M in $CrO_4^=$, and the (Cl$^-$) was depleted to 0.06 M. The total volume in the external system had increased to 1,000 cc as a result of osmotic pumping of water.

Considering the mass transfer of $CrO_4^=$ in the same way that nonionic species were characterized, one can take the initial rate of transfer and calculate a membrane permeability:

$$P = \frac{3.0}{60 \times 153} \ln \frac{2 \times 10^{-4}}{4 \times 10^{-6}} = 1.3 \times 10^{-3} \text{ cm/sec}$$

$$R = 13 \text{ min/cm}$$

This is seen to be significantly higher than the rates attained for non-electrolytes. The comparison is, of course, not valid since the derivation assumes that only the concentration difference in ($CrO_4^=$) provides the driving force. Instead, recent work indicates that the driving force is the Donnan potential which drives the system toward the equilibrium:

$$N = \frac{(Cl^-)_1}{(Cl^-)_2} = \frac{(CrO_4^{--})^{1/2}{}_1}{(CrO_4^{--})^{1/2}{}_2}$$

As the core solution flows through the length of each fiber, the anions present exchange across the semipermeable walls of the fibers. The exit concentration of the core solution is <0.02 ppm $Cr^{+6}$ and 22 ppm Cl$^-$. Present federal standards for effluents are less than 0.05 ppm of chromium. The external solution increases in Cr concentration, and after 13 liters of core fluid have been treated, the external solution has been enriched by 4.9 moles of Cr. The process will continue so long as the Donnan equilibrium condition has not been achieved. When the feed rate was increased to 16 cc/min, the exit concentration of dichromate was found to be as low as 0.7 ppm.

The applications for such a process are numerous. The process is equivalent to a continuous form of the same steps that are taken batchwise when ion-exchange resins are used. For example, if the same resin in bead form were used in an absorption column, the process steps would be as follows:

The $CrO_4^=$ containing solution would be percolated through the columns, and absorption would take place until the bead capacity was exhausted. Then the feed flow would be changed to a strong NaCl (or HCl) solution, and the absorbed $CrO_4^=$ would be eluted, and the combined NaCl washes would be collected. The process would then begin again. By contrast, the Donnan system performs these steps simultaneously, so that a continuous process results.

The hollow fibers of this invention permit a packing density, i.e. area available per bulk volume of exchanger, much higher than in other configurations. The treated fibers have a high ion-exchange capacity, a practical wall permeability and good mechanical strength. Bundles of these fibers will find use in continuous removal of ions from solution without the need for regeneration. The treated fibers will also find use in fuel cells, chemical batteries and in liquid chromatography. The fiber may be cut in sections after chromatographic separation to provide samples for quantitative or qualitative analysis.

The treated fibers of the invention are quite different in structure from ion-exchange membranes formed by dispersion of ion-exchange particles in a matrix or formed by grafting ion-exchange monomers onto the surface. The initial fiber structure has a microporosity of the order of angstroms which permits solutes having molecular weights below about 5,000 to freely diffuse through the wall. The ion-exchange particles are formed within this pore structure.

Obviously there is not very much void space in a pore so that the possibility of solution flowing through a pore without encountering an ion-exchange site is small. This leads to the relatively high efficiencies, i.e. the semipermeability of the fiber wall.

At the same time it is known that from the weight of water imbibed per gram of untreated fiber, that the amount of void space in the wall is fairly large. The pores provide a relatively large volume in which the ion-exchange particles can be formed and permits the achievement of fairly high ion-exchange capacities.

It is to be understood that only preferred embodiments of the invention has been described and that numerous substitutions, alterations and modifications may be made without departing from the spirit and scope of the invention as defined in the following claims.

What is claimed is:

1. A method of removing ions from solution comprising the steps of:
    passing a first solution of a salt through the central channel of a hollow, thin-wall microporous fiber of a synthetic, organic, thermoplastic resin having pores which join to form a path across the wall of the fiber and containing solid, insoluble, ion-exchange resin particles formed in situ in said pores from ion-exchange resin reactants of a molecular weight capable of impregnating the pores, having a diameter smaller than the pore diameter and having an even distribution of fixed charge embedded and constrained within said pores without blocking said pores or said path; and passing the ion of unlike charge to the fixed charge of the embedded resin through the wall of the fiber.

2. A method according to claim 1 in which a plurality of fibers are assembled as a bundle attached to a common inlet header and a common outlet header.

3. A method according to claim 2 in which the outside surface of the fibers are immersed in a second solution of an ion of like charge and lower valence to the ion passing through the wall and at a concentration higher than said first solution.

4. A method according to claim 3 in which the ion-exchange resin particles are polyquaternary resin particles and the ion passing through the wall is a chromate ion.

5. A method according to claim 3 in which the resin is a reaction product of a vinyl pyridine and an organic dihalide spontaneously copolymerizable therewith under ambient conditions.

6. A method according to claim 5 in which the vinyl pyridine is 4-vinyl pyridine and the organic dihalide is a compound of the formula:

$$X - R_1 - X$$

where X is halo and $R_1$ is a divalent organic radical containing from 1–20 carbon atoms.

7. A method according to claim 6 in which X is chloro or bromo and $R_1$ is a divalent organic radical selected from alkylene, alkenylene, alkynylene, arylene, alkarylene and aralkylene.

8. A method according to claim 7 in which the organic dihalide is 1,2-dibromoethane.

9. A method according to claim 1 in which the wall thickness is from 10 to 300 microns.

10. A method according to claim 9 in which the internal diameter is from 50 to 1,000 microns.

11. A method according to claim 1 in which the pores are evenly distributed throughout the wall of the fiber and have an average diameter less than 1,000 angstroms.

12. A method according to claim 1 in which said fiber resin is a fiber grade polyacrylonitrile resin.

13. A method according to claim 12 in which the hydraulic permeability of the fiber is from 1 to 100 × $10^{-5}$ ml/cm² sec atm.

14. A method according to claim 1 in which the resin particles embedded in said pores do not block said pores to passage of selected ions through the wall to a solution of ions of higher concentration and like charge of the selected ions.

15. A method according to claim 1 in which the ion-exchange resin particles contain an even distribution of cationic charge.

* * * * *

UNITED STATES PATENT AND TRADEMARK OFFICE
CERTIFICATE OF CORRECTION

PATENT NO. : 3,944,485
DATED : March 16, 1976
INVENTOR(S) : Alan Rembaum; Shiao-Ping S. Yen; Elias Klein It is certified that error appears in the above-identified patent and that said Letters Patent are hereby corrected as shown below:

Column 4, line 12, "shallow" should read --hollow--;

line 58, "wate" should read --water--.

Column 5, line 51, "$\bar{A}$" should read --A--.

Column 10, line 8 , "inlet" should read --Example--.

Signed and Sealed this first Day of June 1976

[SEAL]

Attest:

RUTH C. MASON
Attesting Officer

C. MARSHALL DANN
Commissioner of Patents and Trademarks